United States Patent [19]

Davis

[11] Patent Number: 5,392,452
[45] Date of Patent: Feb. 21, 1995

[54] SELECTIVE CALL SIGNALING SYSTEM WITH COMBINED WIDE AREA PAGING AND HIGH DATA RATE TRANSMISSIONS VIA RADIO TELEPHONE TRANSCEIVERS

[75] Inventor: Walter L. Davis, Coral Springs, Fla.

[73] Assignee: Motorola, Inc., Schaumburg, Ill.

[21] Appl. No.: 982,341

[22] Filed: Nov. 27, 1992

[51] Int. Cl.$^6$ .............................................. H04B 7/00
[52] U.S. Cl. .............................. 455/38.1; 340/825.44; 379/57; 379/58; 455/54.1
[58] Field of Search ...................... 455/54.1, 33.4, 33.2, 455/38.1, 53.1, 227, 228, 103; 379/57, 58, 88, 89; 340/825.44

[56] References Cited

U.S. PATENT DOCUMENTS

| | | | |
|---|---|---|---|
| 4,661,972 | 4/1987 | Kai | 379/57 |
| 4,747,122 | 5/1988 | Bhagat et al. | 379/57 |
| 4,748,655 | 5/1988 | Thrower et al. | 379/60 |
| 4,885,577 | 12/1989 | Nelson | 379/88 X |
| 5,144,648 | 9/1992 | Bhagat et al. | 379/88 X |
| 5,148,473 | 9/1992 | Freeland et al. | 379/57 X |
| 5,249,302 | 9/1993 | Metroka et al. | 455/93 X |

FOREIGN PATENT DOCUMENTS

| | | | |
|---|---|---|---|
| 0212761A2 | 3/1987 | European Pat. Off. | H04Q 7/04 |
| 0263666A2 | 4/1988 | European Pat. Off. | H04M 1/72 |
| 63-224422A | 9/1988 | Japan | H04B 7/26 |

Primary Examiner—Edward F. Urban
Assistant Examiner—Philip J. Sobutka
Attorney, Agent, or Firm—Pablo Meles; John H. Moore

[57] ABSTRACT

A cooperative paging system (10) and radio telephone system (15) combine to provide conventional delivery of short paging messages to a combination pager/radio telephone (40) via a first communication path, while a radio telephone link operating at a higher data rate is used to deliver large data messages to the pager/radio telephone (40). The radio telephone link is formed by a transceiver section (205) of the pager/radio telephone (40) coupling to a radio telephone base station (50,52) and calling up a paging terminal (32) of the paging system (10). The paging terminal (32) retrieves the large data messages from a temporary message memory (42) to deliver to the pager/radio telephone (40).

28 Claims, 5 Drawing Sheets

SELECTIVE CALL SIGNALING SYSTEM WITH COMBINED WIDE AREA PAGING AND HIGH DATA RATE TRANSMISSIONS VIA RADIO TELEPHONE TRANSCEIVERS

FIELD OF THE INVENTION

This invention relates in general to a combination paging system and radio telephone system, and in particular to a method and apparatus for high data rate transmission of lengthy pages to a radio paging receiver coupled to a radio telephone transceiver.

BACKGROUND OF THE INVENTION

Selective call signaling systems (e.g., paging systems) provide one-way radio frequency (RF) communication of selective call messages, called pages, from a message originator to a paging receiver. The message originator contacts the paging system via the public switched telephone network system or other input interface means and provides the message information to a paging terminal. The message information is encoded into a conventional signaling protocol, modulated onto a carrier signal, and transmitted as an RF signal to the paging receiver. The paging receiver receives the signal, demodulates and decodes the signal to recover the messages and presents the message to a user of the receiver.

Air time is a precious commodity in selective call signaling systems. A selective call system service provider wishes to provide service for a large number of subscribers (receiver users) in order to obtain high revenue. With short voice and numeric messages, the length of the message has not had an impact on message throughput. However, alphanumeric messages can pose a difficulty. Page entry devices for alphanumeric messages include personal computers which can generate extremely long messages. In addition, originators may wish to send longer voice messages, graphic images and facsimile messages.

To increase message throughput of longer messages, the data rate of the paging system can be increased. Yet the data rate has limitations imposed by the performance of wide area paging systems. For example, the inter-symbol interference generated by multipath distortion becomes a significant limiting factor in simulcast paging systems when the data rate is increased beyond six kilobits per second.

In addition, the data rate has limitations imposed by governmental regulatory agencies such as the United States Federal Communications Commission (FCC). For example, inter-channel interference can be generated by high data rate signals, and the FCC can specify maximum power of signal emissions (translating to specifying maximum data rates of signals) if the inter-channel interference rises above a certain level.

Thus, what is needed is a high data rate transmission scheme for handling lengthy alphanumeric, voice, graphic, and facsimile selective call messages.

SUMMARY OF THE INVENTION

In one form of the invention, there is provided a method for transmitting messages in a paging system comprising the steps of receiving message information, determining whether the message information comprises information greater than a predetermined message length, storing the message information in a memory device if the message information is greater than the predetermined message length, and transmitting a predetermined message to a pager via a first communication path, the predetermined message indicating that the message information is stored in the memory device. The method further comprises the steps of coupling to the pager via a second communication path, retrieving the message information from the memory device, and transmitting the message information to the pager via the second communication path.

In another form, there is provided a selective call receiver comprising receiving means for receiving paging signals from a paging terminal via a first communication path, decoding means coupled to the RF receiving means for decoding the paging signals to recover a page, determining means for determining whether the page is a predetermined page, and control means for coupling to the paging terminal via a second communication path in response to the determining means determining that the page is the predetermined page.

DETAILED DESCRIPTION OF THE INVENTION

Figure 1:
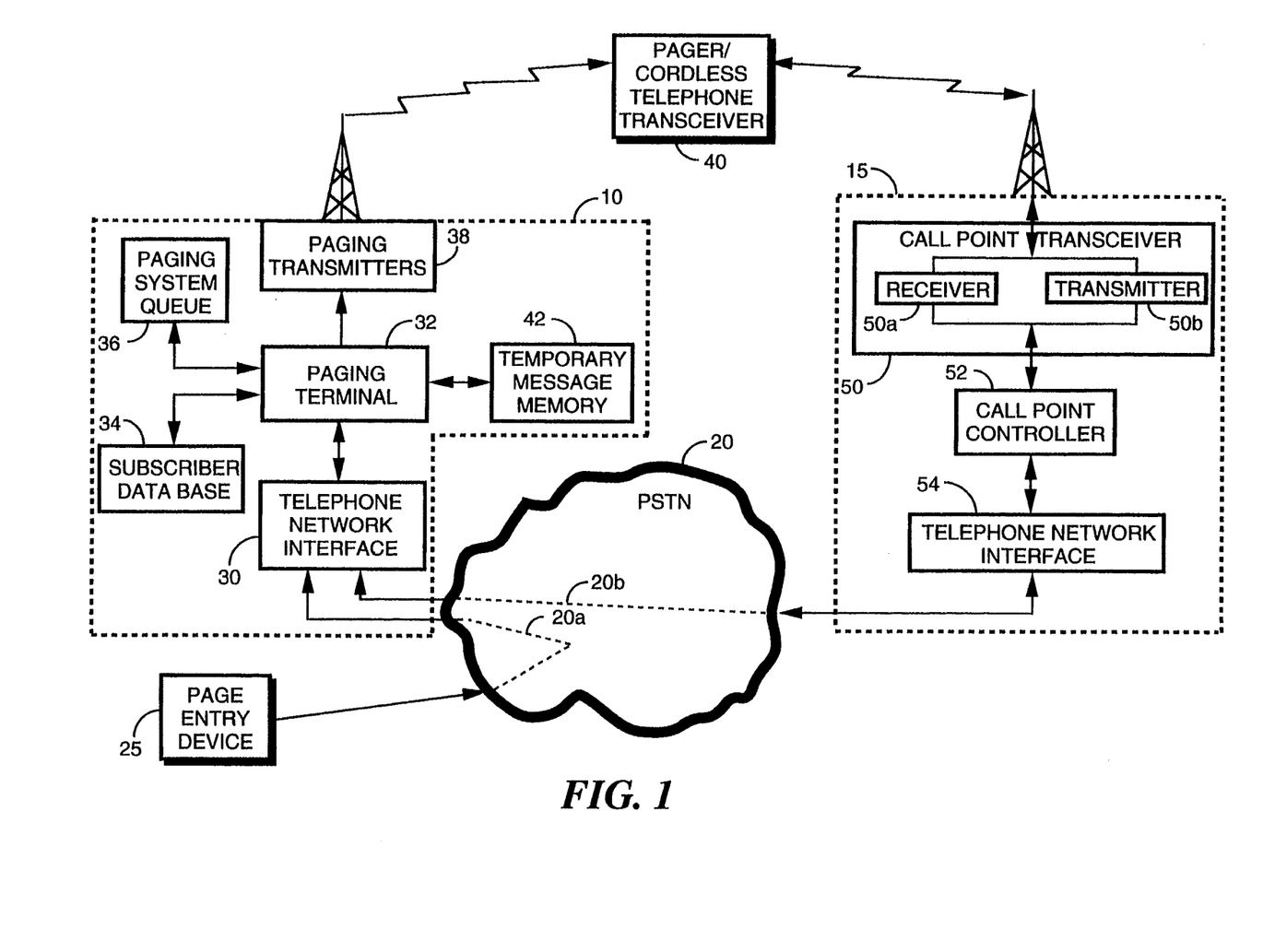
FIG. 1 is a diagram of a combination paging system and cordless telephone system in accordance with the preferred embodiment of the present invention.

Referring to FIG. 1, a selective call signaling system combining communication across a first communication path, such as a wide area paging system 10, and a second communication path, such as a cordless telephone system 15, uses the public switched telephone network (PSTN) 20 for communication therebetween. A message originator utilizes a page entry device 25 to enter paging information via the PSTN 20 for transmission to a subscriber of the paging system 10.

Typically, the page entry device 25 is a telephone for entry of voice or numeric information. The page entry device 25 could also comprise a data processing device, such as a computer terminal, for generation of paging information comprising graphics, facsimile or alphanumeric information.

The originator composes the message to be provided as paging information on a computer terminal and then places a call via a modem or other device to the system access number of the paging system 10, coupling the page entry device 25 to a telephone network interface 30 of the paging system 10 via PSTN path 20a. The paging information is then provided from the page entry device 25 to the telephone network interface 30 and thence to a paging terminal 32 for processing thereby. The paging terminal 32 accesses a subscriber data base 34 to obtain a subscriber address to associate with the paging information to form a page. The terminal 32 then places the page into the paging system queue 36 for later transmission.

The pages stored in the paging system queue 36 are retrieved sequentially by the paging terminal 32 and provided to the paging transmitters 38 for transmission as selective call signals therefrom. A wide area paging system typically includes several transmitters which simulcast the selective call signals to increase the probability of message reception. To prevent undue intersymbol interference generated by multipath distortion, the data rate of the selective call signals is kept below six kilobits per second.

Selective call signals transmitted from the paging system 10 are received by a combination paging receiver (pager) and radio telephone, such as a combination pager and cordless telephone transceiver 40. The pager receives the selective call signals while the cordless telephone transceiver, such as a second generation cordless telephone (CT-2) transceiver, can couple to the PSTN 20 via the cordless telephone system 15 for communication therewith.

In accordance with the present invention, the paging terminal 32 determines which messages are lengthy messages. The lengthy messages are stored in a temporary message memory 42 for subsequent retrieval therefrom. A predetermined page is generated by the paging terminal 32 and subsequently transmitted via the paging transmitters/ 38 to the pager/cordless telephone transceiver 40. Upon receipt of the predetermined page, the cordless telephone transceiver couples to the nearest cordless telephone call point station of the cordless telephone system 15 by signaling a call point transceiver 50 comprising a receiver 50a and a transmitter 50b. The signals received by the receiver 50a are provided to a call point controller 52 for processing thereby. Once coupled thereto, the pager/cordless telephone 40 signals the call point controller to couple to the PSTN 20 via a telephone network interface 54 and to call up the paging system 10 on path 20b. Once the call point controller 52 calls up the paging terminal 32, the lengthy message is retrieved from the temporary message memory 42 and transmitted to the combination pager and cordless telephone 40.

The second communication path could, alternatively be a cellular telephone system comprising cellular telephone bases sites for coupling a cellular handset to the PSTN 20. The pager would be combined with a cellular handset to allow coupling to the paging terminal 32 via the cellular telephone system.

Figure 2:
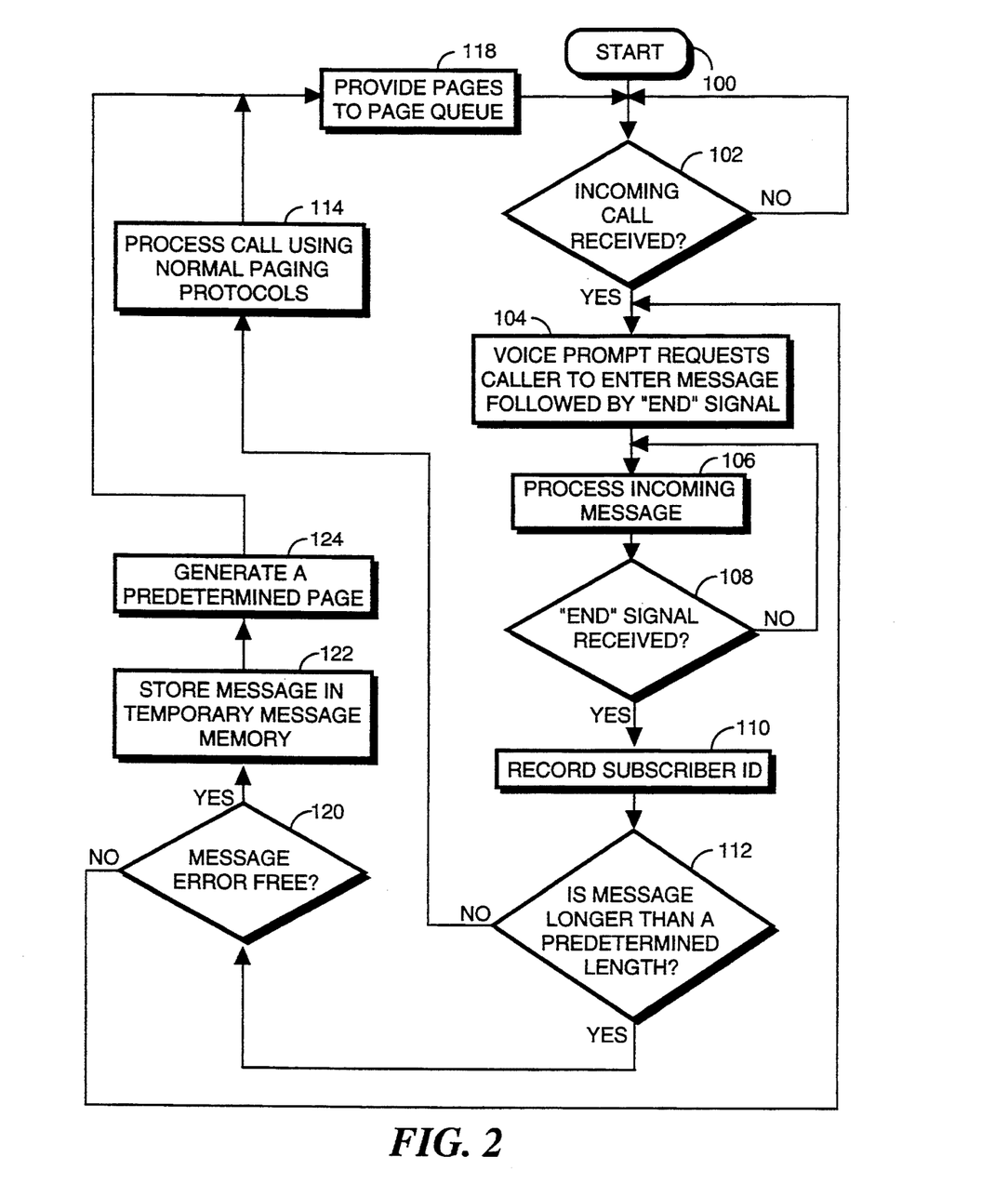
FIGS. 2 and 3 are flow diagrams of the operation of the paging terminal in the combination paging system and cordless telephone system of FIG. 1 in accordance with the preferred embodiment of the present invention.

Referring next to FIG. 2, a flowchart of the operation of the paging terminal 32 depicts the message entry routine. After startup 100, processing monitors the telephone network interface 30 (FIG. 1) to await reception of an incoming call 102 from a page entry device 25 (FIG. 1). When an incoming call is received 102, the paging terminal 32 generates a voice prompt 104 requesting the caller (i.e., the message originator) to enter the message followed by an "end" signal. The "end" signal indicates the end of the message. The paging terminal 32 processes the incoming message 106 until the "end" signal is received 108.

Next, the subscriber identification code (ID) is recalled from the subscriber data base 34 (FIG. 1) 110. The length of the message is measured and if the message length is not greater than a predetermined length 112, the call is processed using conventional paging protocols 114. The page is then provided 118 to the paging system queue 36 (FIG. 1) and processing returns to the initial idle loop to await reception of the next incoming call 102.

If the message length is longer than the predetermined length 112, the message is examined to determine if it is error free 120. If the message is not error free 120, processing returns to provide the voice prompt 104 requesting the caller to again enter the message. If the message is error free 120, the message along with the subscriber ID is stored 122 in the temporary message memory 42 (FIG. 1). The paging terminal 32 generates a predetermined page comprising an address corresponding to the recorded subscriber ID and a predetermined message 124. The predetermined message, when received by the pager/cordless telephone transceiver 40 (FIG. 1), indicates that a lengthy message is stored in the temporary message memory 42. Alternatively, an address corresponding to the subscriber ID and defined to indicate storage of a lengthy message could be incorporated in the predetermined page. The predetermined page is thereafter provided 118 to the paging system queue 36 (FIG. 1) for subsequent transmission.

Figure 3:
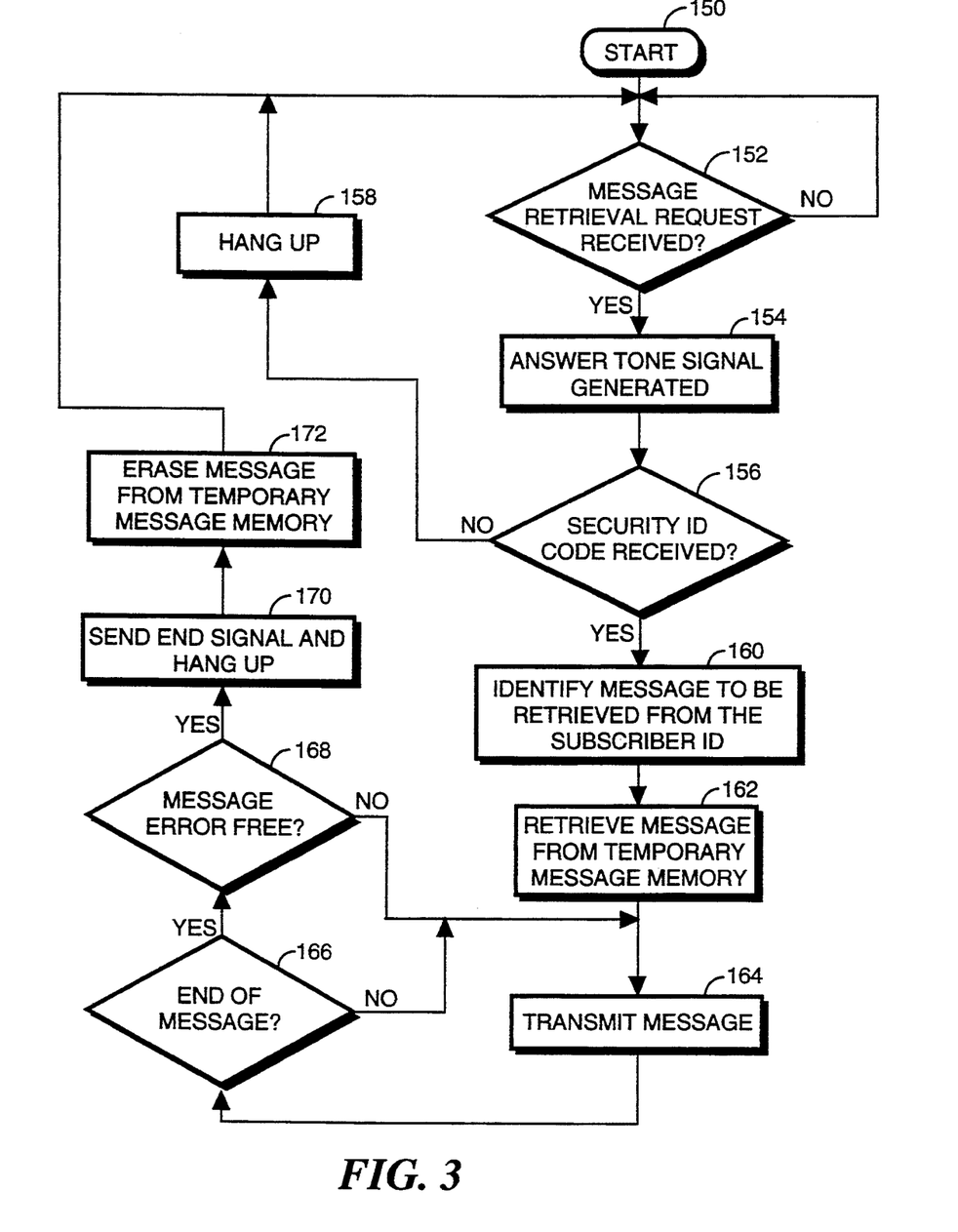

Referring next to FIG. 3, a flowchart of the operation of the message retrieval routine of the paging terminal 32 in accordance with the preferred embodiment of the present invention is depicted. After startup 150, the paging terminal 32 monitors the telephone network interface 30 (FIG. 1) to await the reception of a message retrieval request 152. When a message retrieval request is detected 152, an answer tone signal is generated 154 and the signal received is examined to see if a predetermined security identification (ID) code is received 156.

If the security ID code is not received within a predetermined time 156, the paging terminal hangs up 158, thereby terminating the call. If the security ID code is received 156, the message to be retrieved from the temporary message memory 42 (FIG. 1) is identified by the subscriber ID 160 received with the security ID code. The identified message is then retrieved 162 and transmitted across the telephone lines 164 to the cordless telephone transceiver and thence to the pager. Current CT-2 links can support duplex data transmission rates of thirty-two kilobits per second and in the near future will be able to support one-way transmissions at sixty-four kilobits per second. This allows high data rate transmission of the lengthy messages to the combination pager and cordless telephone transceiver by utilization of the cordless telephone link.

The message is transmitted 164 until the end of the message is detected 166. When the end of the message is detected 166, processing awaits an indication from the cordless telephone that the message was received error free 168. If the message was not received error free 168, the message is retransmitted 164.

If the message is received error free 168, the paging terminal 32 (FIG. 1) sends and end signal and hangs up 170. The paging terminal then erases 172 the message from the temporary message memory 42 (FIG. 1) and returns to await the next message retrieval request received 152.

Figure 4:
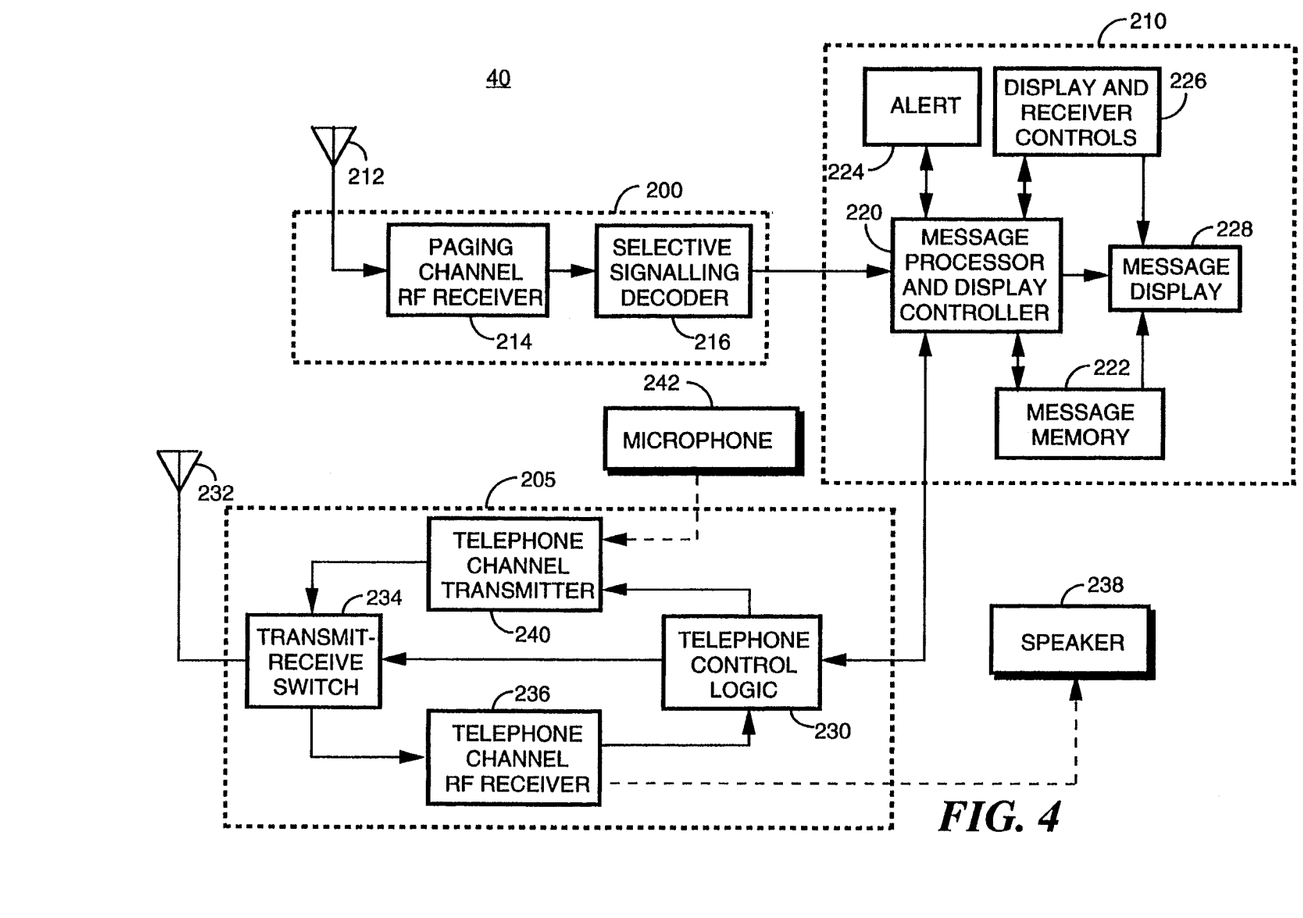
FIG. 4 is a block diagram of the combination pager and cordless telephone transceiver of FIG. 1 in accordance with the preferred embodiment of the present invention.

Referring to FIG. 4, the combination pager and cordless telephone transceiver 40 (FIG. 1) according to the preferred embodiment of the present invention comprises a paging receiver section 200, a cordless telephone transceiver section 205, and a message and display controller section 210. The paging receiver section 200 includes an antenna 212 for receiving selective call signals, a paging channel radio frequency (RF) receiver 214 coupled to the antenna for demodulating the selective call signals, and a selective signaling decoder 216 for decoding the demodulated signal to recover the page transmitted therein.

The decoded page is provided to a message processor and display controller 220 for processing thereby. In accordance with conventional paging operations, the decoded page is stored in a message memory 222 and the user (subscriber) is alerted via an alert device 224 that a page has been received. The user can activate user and display controls 226 to retrieve the page from the message memory 222 and display the page on a message display 228. The controls 226 can manipulate the message display 228 or alter receiving parameters in a manner well known to those skilled in the art.

Operation of the cordless telephone transceiver section 205 is controlled by a telephone control logic device 230. An antenna 232 is utilized for transceiving signals for conventional transceiver operation. The antenna 232 is coupled to a transmit-receive switch 234 which operates under the control of the telephone control logic 230. The transmit-receive switch 234 in one position couples the antenna 232 to a telephone channel RF receiver 236 for processing received RF signals and providing the signals to the telephone control logic 230. In a second position, the transmit-receive switch 234 couples the antenna 232 to a telephone channel transmitter 240 which processes signals received from the telephone control logic 230 for transmittal as an RF signal from the antenna 232.

In an alternate embodiment, a speaker 238 can be coupled to the receiver 236 and a microphone 242 can be coupled to the transmitter 240 for conventional cordless telephone operation. In the alternative embodiment, the receiver 236 would provide audio portions of the signals to the speaker 238 and digital portions of the signals to the telephone control logic 230. The transmitter 240 would process audio signals received from the microphone 242 and digital signals received from the telephone control logic 230 for transmission from the antenna 232.

In accordance with the present invention, the telephone control logic 230 is coupled to the message processor 220 for improved reception of lengthy messages. When the message processor 220 detects a predetermined decoded page, the telephone control logic 230 is signaled to call up the paging terminal 32 through transmission of signals to a call point transceiver 50 (FIG. 1). Once the telephone control logic 230 couples to the paging terminal 32 (FIG. 1), a lengthy message is retrieved by the paging terminal 32, received by the telephone channel RF receiver 236 and provided to the message processor 220 via the telephone control logic 230. The lengthy message is then stored in the message memory 222 and the user is alerted of the message's reception by the alert 224. Thus, the message download by cordless telephone link could be automatic and transparent to the user. Alternatively, the message processor 220 could alert the user when the predetermined page is received, indicating that the user should move to a cordless telephone call point station to receive the message.

Figure 5:
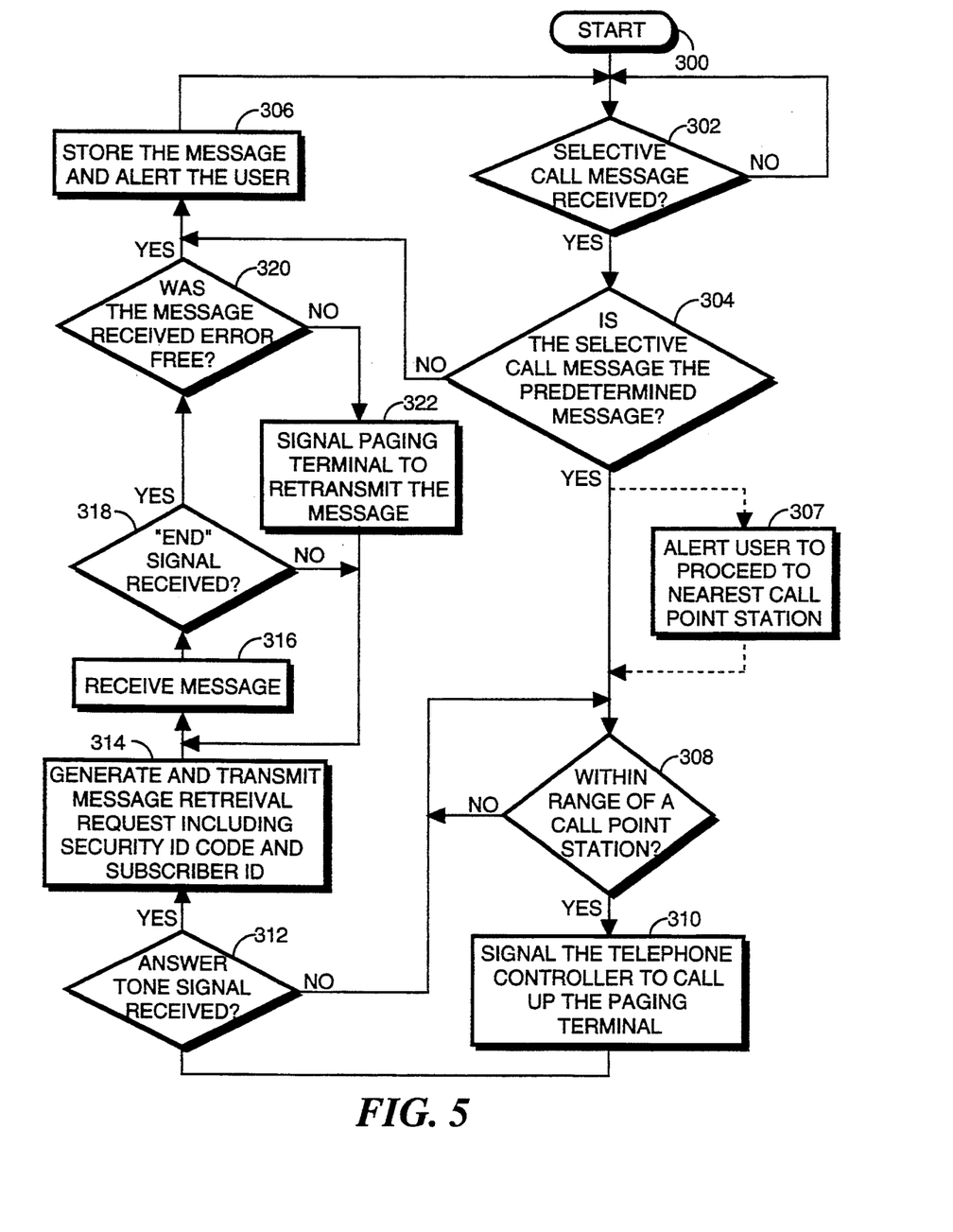
FIG. 5 is a flow diagram of the operation of the paging message processor in the combination pager and cordless telephone transceiver of FIG. 4 in accordance with the preferred embodiment of the present invention.

Referring to FIG. 5, a flowchart of the operation of the message processor and display controller 220 (FIG. 4) in accordance with the preferred embodiment of the present invention is shown. After startup 300, the message processor 220 awaits reception of a decoded selective call message 302 provided from the selective signaling decoder 216 (FIG. 4). When a selective call message is received 302, processing determines if the received message is the predetermined page 304 indicating that a lengthy message is stored in the temporary message memory 42 (FIG. 1).

If the decoded message is not the predetermined page 304, the message is stored 306 in the message memory 222 and the user is alerted via the alert device 224 (FIG. 4) in a manner well known to those skilled in the art. If, on the other hand, the predetermined page is detected 304, the message processor 220, in accordance with the preferred embodiment of the present invention, communicates with the cordless telephone transceiver section 205 (FIG. 4) to determine 308 when the combination pager and cordless telephone transceiver 40 is within range of a cordless telephone call point station 50 (FIG. 1).

The preferred embodiment of the present invention operates automatically and is transparent to the user. The lengthy message is retrieved from the paging system and stored in the message memory 222 (FIG. 4) before the user is notified that a message has been sent. Alternatively, the user can be alerted 307 to instruct the user that a message is waiting to be retrieved and that the user needs to proceed to the nearest cordless telephone call point station.

When the user is within range of a cordless telephone call point station 308, the message processor 220 signals 310 the telephone control logic (controller) 230 (FIG. 4) to call up the paging terminal 32 (FIG. 1). If an answer tone signal has not been received 312 within a predetermined time after calling up 310 the paging terminal 32 (FIG. 1), processing returns to determine whether the pager/cordless telephone 40 is still within range of a cordless telephone call point station 308.

When an answer tone signal is received 312, the message processor 220 generates a message retrieval request 314 including a security ID code and a subscriber ID corresponding to the pager, providing the message retrieval request to the cordless telephone section 205 for transmission therefrom. The security ID code prevents unauthorized access to the messages stored in the temporary message memory 42 (FIG. 1). The message processor then receives the message 316 retrieved from the temporary message memory 42 by the paging terminal 32 and transmitted to the pager/cordless telephone transceiver 40 via land-line phone system (PSTN) 20 and the cordless telephone system 15 at a high speed data rate (e.g., thirty-two or sixty-four kilobits per second). Thus, in a time much shorter than the air time required by the paging system 10 to send the lengthy message, the message can be retrieved 316 with the "end" signal indicating the end of the message 318.

The present invention also provides the added advantage of allowing the message processor 220 to use conventional forward error correction and detection techniques to determine if the message is received error free 320 and to signal the paging terminal 32 to retransmit the message 322 or portions thereof if data corruption or errors are detected 320. When the message is received error free 320, the message is stored 306 in the message memory 222 and the user is alerted that a message is received.

By now it should be appreciated that there has been provided a cooperative paging system and cordless telephone system which combines the best features of the two systems to provide improved paging throughput by allowing longer messages to be sent through the system without undue burden on the paging system signal capacity. The paging system provides normal paging operations and delivers short messages to the pager while the cordless telephone link (which operates at a higher data rate) is used to deliver large data messages to the pager in a manner that is transparent to the user.

What is claimed is:

1. A method for transmitting messages in a paging system comprising the steps of:
   (a) receiving message information;
   (b) determining whether the message information comprises information greater than a predetermined message length;
   (c) storing the message information in a memory device if the message information is greater than the predetermined message length;
   (d) transmitting a predetermined message to a pager via a first communication path, the predetermined message indicating that the message information is stored in the memory device;
   (e) automatically coupling to the pager via a second, wireless communication path in response to the predetermined message;
   (f) retrieving the message information from the memory device; and
   (g) transmitting the message information to the pager via the second communication path.

2. The method in accordance with claim 1 further comprising after the step (b) of determining, the step (b1) of transmitting a page comprising the message information to the pager via the first communication path if the message information is not greater than the predetermined message length.

3. The method in accordance with claim 2 wherein the step (b1) comprises the step of transmitting the page comprising the message information via the first communication path at a first data rate to the pager, and wherein the step (g) comprises the step of transmitting the message information to the pager via the second communication path at a second data rate.

4. The method in accordance with claim 3 wherein the second data rate is substantially greater than the first data rate.

5. The method in accordance with claim 1 wherein the first communication path comprises a radio frequency (RF) paging communication path.

6. The method in accordance with claim 1 wherein the second communication path comprises a telephone network, and wherein step (a) comprises the step of (a1) receiving message information via the telephone network.

7. The method in accordance with claim 1 wherein the second communication path further comprises a cellular telephone system coupled to the telephone network.

8. The method in accordance with claim 1 wherein the second communication path further comprises a cordless telephone system coupled to the telephone network.

9. A selective call signaling system having a plurality of selective call receiver units capable of transmitting message retrieval results, comprising:
   telephone interface means for receiving paging messages including lengthy paging messages;
   paging terminal means coupled to the telephone interface means for determining whether the paging messages are lengthy paging messages and for generating a predetermined selective call message if a paging message is a lengthy paging message;
   temporary memory means coupled to the paging terminal means for storing the lengthy paging messages;
   first transmitting means coupled to said paging terminal means for wireless transmitting of selective call signals that are not lenqthy paging messsages including said predetermined selective call messages; and
   second transmitting means for wireless transmitting of the lengthy paging messages, wherein said paging terminal means retrieves one of said lengthy paging messages stored in said temporary memory means in response to reception by the paging terminal means of a message retrieval requiest from a selective call receiver.

10. A selective call receiver comprising:
    receiving means for receiving paging signals from a paging terminal via a first communication path;
    decoding means coupled to the RF receiving means for decoding the paging signals to recover a page;
    determining means for determining whether the page is a predetermined page; and
    control means for automically coupling to the paging terminal via a second, wireless communication path in response to the determining means determining that the page is the predetermined page.

11. The selective call receiver of claim 10 wherein the first communication path comprises radio frequency (RF) signals transmitted from the paging terminal, and wherein the receiving means comprises RF receiving means for receiving and demodulating the RF signals to recover the paging signals.

12. The selective call receiver of claim 10 wherein the second communication path comprises a radio telephone system, and wherein the control means comprises:
    coupling means for coupling to the radio telephone system; and
    call up means for coupling the radio telephone system to the paging terminal.

13. The selective call receiver of claim 12 wherein the radio telephone system comprises a cordless telephone system, and wherein the control means comprises:
    coupling means for coupling to a call point transceiver of the cordless telephone system; and
    call up means for coupling the call point transceiver to the paging terminal.

14. A selective call receiver comprising:
    radio frequency (RF) receiving means for receiving paging signals transmitted from a paging terminal.
    decoding means coupled to the RF receiving means for decoding the paging signals to recover a page;
    determining means for determining whether the page is a predetermined page; and
    control means for automatically coupling to the paging terminal via a radio telephone network in response to the determining means determining that the page is the predetermined page.

15. The selective call receiver of claim 14 further comprising:
    memory means for storing the page; and
    alert means for alerting a user that the page has been received, wherein the control means comprises:
    means for coupling to the telephone network in response to the determining means determining that the page is the predetermined page;

means for storing the page in the memory means in response to the determining means determining that the page is not the predetermined page; and means for activating the alert means in response to the storing means storing the page.

16. The selective call receiver of claim 14 wherein said control means comprises:

means for coupling to the telephone network in response to the determining means determining that the page is the predetermined page;

means for requesting the paging terminal to retrieve a paging message; and means for receiving the retrieved paging message.

17. The selective call receiver of claim 16 further comprising:

memory means for storing the page; and alert means for alerting a user that the page has been received, and wherein the control means further comprises:

means for storing the page in the memory means in response to the determining means determining that the page is not the predetermined page and for storing the retrieved paging message in the memory means in response to the determining means determining that the page is the predetermined page; and means for activating the alert means in response to the storing means storing the page and in response to the storing means storing the retrieved paging message.

18. The selective call receiver of claim 17 wherein the activating means activates the alert means in response to the determining means determining the page is the predetermined page, in response to the storing means storing the page, and in response to the storing means storing the retrieved paging message.

19. The selective call receiver of claim 16 wherein the requesting means provides a security identification code and a subscriber identification to the paging terminal to request the paging terminal to retrieve the paging message.

20. The selective call receiver of claim 16 wherein the control means further comprises means for detecting errors in the retrieved paging message, and wherein the requesting means requests the paging terminal to retrieve the paging message an additional time if the detecting means detects errors in the received retrieved paging message.

21. The selective call receiver of claim 16 wherein the coupling means comprises means for radio frequency coupling to a cordless telephone system telepoint base station in response to the determining means determining that the page is the predetermined page.

22. The selective call receiver of claim 16 wherein the coupling means comprises means for radio frequency coupling to a cellular telephone system base site in response to the determining means determining that the page is the predetermined page.

23. A combination pager and cordless telephone transceiver comprising:

first receiving means for receiving paging signals provided from a paging terminal;

decoding means coupled to the first receiving means for decoding the paging signals to recover a page;

determining means for determining whether the page is a predetermined page;

transceiver means for coupling to a cordless telephone system call point transceiver for communicating thereby; and control means coupled to the determining means and the transceiver means for autmmatically coupling the transceiver means to a cordless telephone system call point transceiver for conununicating to the paging terminal in response to the determining means determining that the page is the predetermined page.

24. The combination pager and cordless telephone transceiver of claim 23 wherein the page comprises a paging address correlating to one of at least one address assigned to the pager, and wherein the determining means determines whether the page is the predetermined page in response to the paging address correlating to a predetermined one of the at least one address assigned to the pager.

25. The combination pager and cordless telephone transceiver of claim 23 wherein the control means comprises:

means for coupling the cordless telephone means to a cordless telephone system call point transceiver;

means for generating a message retrieval request and for providing the message retrieval request to the transceiver means for transmittal to the cordless telephone system call point transceiver therefrom; and means for storing a message received via the transceiver means.

26. The combination pager and cordless telephone transceiver of claim 25 wherein said message retrieval request comprises a subscriber identification code identifying the combination pager and cordless telephone transceiver and a security identification code.

27. The combination pager and cordless telephone transceiver of claim 25 wherein the coupling means comprises:

means for determining whether the combination pager and cordless telephone transceiver is within communication range of a cordless telephone system call point transceiver; and means for coupling the transceiver means to the cordless telephone system call point transceiver at a time determined in response to the combination pager and cordless telephone being within communication range of a cordless telephone system call point transceiver.

28. The combination pager and cordless telephone transceiver of claim 25 wherein the control means further comprises means for determining whether the message received via the transceiver means is received error free, and wherein said means for generating and providing a message retrieval request generates the message retrieval request in response to the coupling means coupling the cordless telephone means to a cordless telephone system call point transceiver or in response to the error free determining means determining that the message received is received error free.

* * * * *

UNITED STATES PATENT AND TRADEMARK OFFICE
CERTIFICATE OF CORRECTION

PATENT NO.  :  5,392,452
DATED       :  February 21, 1995
INVENTOR(S) :  Walter L. Davis It is certified that error appears in the above-indentified patent and that said Letters Patent is hereby corrected as shown below:

Column 7, Line 62, delete "results" and insert --requests--.

Column 8, line 7, delete "messages" and insert --message--.

Column 8, line 14, delete "requiest" and insert --request--.

Signed and Sealed this

Twenty-sixth Day of December, 1995

*Attest:*

BRUCE LEHMAN

*Attesting Officer*     *Commissioner of Patents and Trademarks*